United States Patent [19]
Yamashita et al.

[11] Patent Number: 5,802,861
[45] Date of Patent: Sep. 8, 1998

[54] EXHAUST GAS DETOXIFICATON FOR INTERNAL COMBUSTION ENGINE

[75] Inventors: Yukihiro Yamashita; Jun Hasegawa, both of Kariya; Yasuhiko Niimi, Handa; Hiroshi Kishita, Anjo, all of Japan

[73] Assignee: Nippondenso Co., Ltd., Kariya, Japan

[21] Appl. No.: 689,496

[22] Filed: Aug. 7, 1996

[30] Foreign Application Priority Data

Aug. 7, 1995 [JP] Japan .................................. 7-201027

[51] Int. Cl.⁶ ...................................................... B60H 1/32
[52] U.S. Cl. .............................. 62/133; 62/228.5; 62/158
[58] Field of Search ................................... 62/133, 228.4, 62/228.5, 229, 158, 226, 227, 228.1, 230

[56] References Cited

U.S. PATENT DOCUMENTS

| | | | |
|---|---|---|---|
| 4,132,086 | 1/1979 | Kountz | 62/228.5 X |
| 4,395,203 | 7/1983 | Takada | 62/133 X |
| 4,510,764 | 4/1985 | Suzuki | 62/133 |
| 4,561,260 | 12/1985 | Nishi et al. | 62/228.5 X |
| 4,836,164 | 6/1989 | Morozami et al. | 123/339 |
| 4,862,700 | 9/1989 | Suzuki | 62/133 X |
| 4,969,334 | 11/1990 | Goubeaux et al. | 62/133 |

FOREIGN PATENT DOCUMENTS

A-62-101867 5/1987 Japan .
U-1-141337 9/1989 Japan .

*Primary Examiner*—Harry B. Tanner
*Attorney, Agent, or Firm*—Nixon & Vanderhye P.C.

[57] ABSTRACT

An exhaust gas detoxifying system includes a catalytic converter in the exhaust system of an engine to detoxify exhaust gas. An air conditioner includes a compressor which is driven by the engine, and it performs air conditioning of the vehicle interior based on a refrigeration cycle. The operation of the air conditioner compressor is restricted depending on the degree of necessity of air conditioning, which is calculated from the difference between a vehicle interior temperature and a target temperature, if the catalytic converter exhaust gas detoxification performance is expected to deteriorate during accelerating or heavy-load operations of the engine.

17 Claims, 14 Drawing Sheets

EXHAUST GAS DETOXIFICATON FOR INTERNAL COMBUSTION ENGINE

BACKGROUND OF THE INVENTION

1. Field of the Invention

The present invention relates to an exhaust gas detoxifying system and method for an internal combustion engine installed on a vehicle, and particularly to a control system for controlling the engine and air conditioner of a vehicle so as to maintain satisfactory exhaust gas detoxification.

2. Description of Related Art

As is known well in the art, exhaust gas produced by the combustion of fuel in an internal combustion engine is led through an exhaust gas pipe to a catalytic converter, in which toxic components (CO, HC and NOx) in the exhaust gas are detoxified by the three-way catalyst and discharged into the atmosphere. It is also known that the detoxification performance of the catalytic converter is greatly dependent on the air-fuel ratio of the mixture fed to the engine. Specifically, a lean air-fuel ratio fosters oxidation and retards reduction of the exhaust gas due to residual oxygen after combustion, while a rich air-fuel ratio retards oxidation and fosters reduction of the exhaust gas. The three-way catalyst works most effectively when oxidation and reduction of exhaust gas equibrate at an air-fuel ratio around 14.7 that is called the stoichiometric air-fuel ratio.

The detoxification performance of the three-way catalyst also depends on the flow rate of exhaust gas, i.e., an increased flow rate of exhaust gas results in a degraded detoxification.

Accordingly, the three-way catalyst of the catalytic converter bases retention of high detoxification performance for prevention of aggravated toxic emission on the following crucial factors:

(a) controlling the mixture air-fuel ratio at around the stoichiometric air-fuel ratio; and (b) preventing the exhaust gas flow rate from being excessive.

Recent land motor vehicles are mostly equipped with air conditioners, and the compressors of the air conditioners are driven by being coupled to the vehicle's engines. However, conventional exhaust gas detoxifying systems are not designed to be controlled in relation to operation of air conditioners, and therefore their performance is deteriorated when the air conditioners are turned on.

Specifically, when the air conditioner is activated, the engine has an increased load, causing exhaust gas flow rate to increase, resulting in a significant deterioration of detoxification by the three-way catalyst. Moreover, when the compressor of an air conditioner is engaged and disengaged with the engine repeatedly or cyclically after the vehicle interior temperature has reached the target temperature, the engine has a cyclic load variation and the air-fuel ratio fluctuates, resulting in a degraded detoxification performance of the three-way catalyst. In any case, a degraded performance of three-way catalyst aggravates the toxic exhaust gas emission of the vehicle's engine.

SUMMARY OF THE INVENTION

Accordingly, it is an object of the present invention to provide an exhaust gas detoxifying system and a method for an internal combustion engine of a land motor vehicle capable of suppressing the aggravation of toxic exhaust gas emission.

According to one aspect of the present invention, a control system calculates the degree of necessity of air conditioning based on physical conditions of the vehicle interior, and restricts operation of the air conditioner depending on the calculated degree of necessity of air conditioning if detoxification performance of the catalytic converter is expected to deteriorate. Preferably, an air conditioning demand value is calculated and, based on the calculated value the, operation time interval of an air conditioner is restricted or turn-on timing of the air conditioner is delayed. This control is performed at the time of stopping the air-fuel ratio feedback control.

According to another aspect of the invention, the system measures the air-fuel ratio of the mixture and inhibits turn-on and turn-off of the air conditioner if the measured air-fuel ratio is outside the prescribed range.

According to a further aspect of the invention, the system turns off the air conditioner when it has been on if the measured air-fuel ratio deviates greatly to the lean side, or turns on the air conditioner when it has been off if the measured air-fuel ratio deviates greatly to the rich side.

According to a still further aspect of the invention, the system implements feedback control of fuel supply to the engine while measuring the air-fuel ratio of the mixture fed to the engine, and raises the feedback gain of the control system immediately before the air conditioner is turned on or turned off.

BRIEF DESCRIPTION OF THE DRAWINGS

Other objects, features and advantages of the present invention will become more apparent from the foregoing description when read with reference to the accompanying drawings: in which.

DETAILED DESCRIPTION OF THE PRESENTLY PREFERRED EMBODIMENTS (Embodiment 1)

Figure 1:
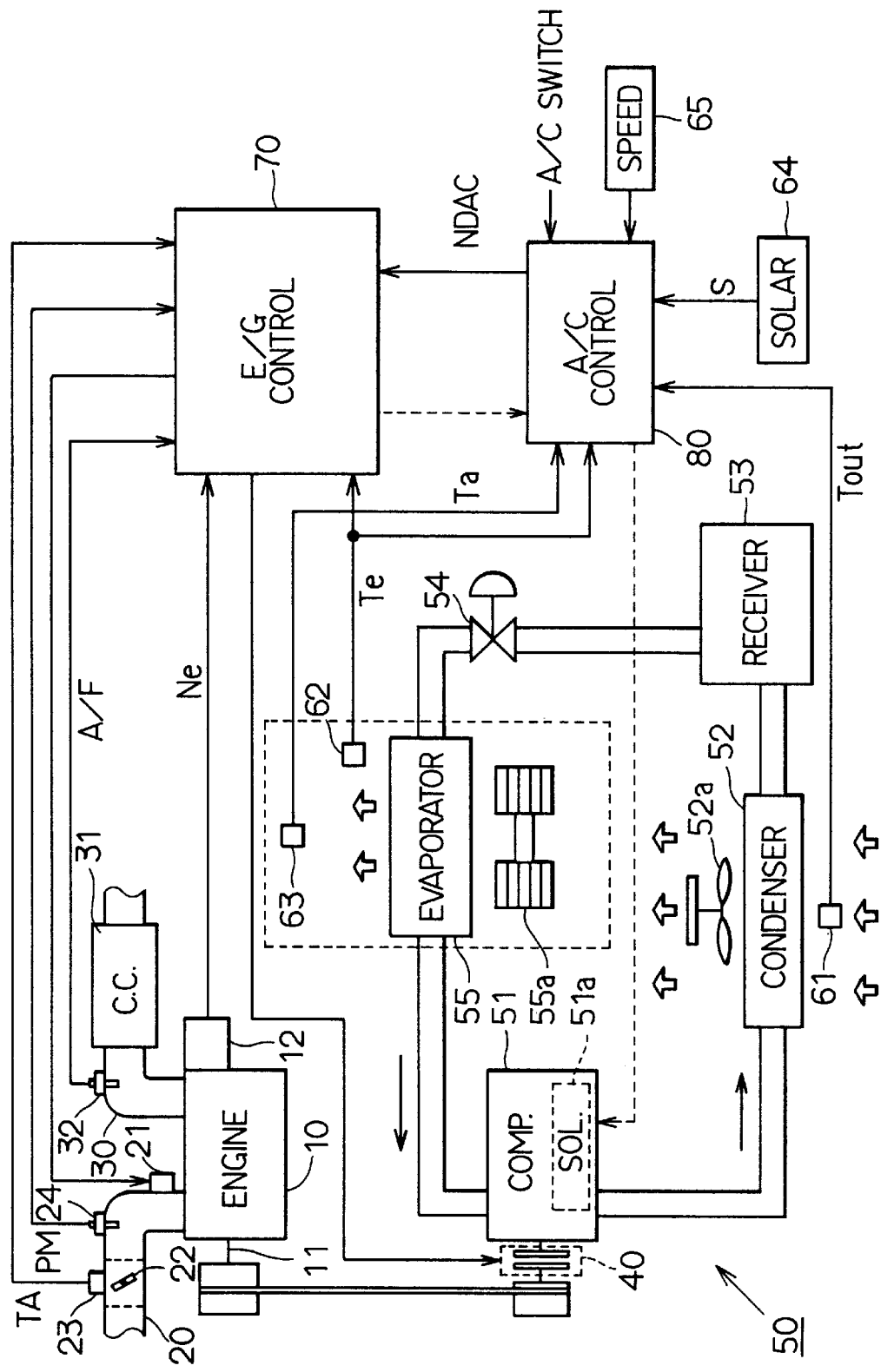
FIG. 1 is a block diagram showing the arrangement of an exhaust gas detoxifying system based on this invention.

FIG. 1 shows an exhaust gas detoxifying system for an internal combustion engine based on a first embodiment of this invention. This embodiment is intended to prevent aggravation of toxic exhaust gas emission due to operation of the air conditioner by restricting the air conditioner operation so that the engine load does not increase to excess.

First, the system arrangement will be explained with reference to FIG. 1. The system includes an engine 10 and its peripheral devices, an air conditioner (A/C) 50 which is driven by the engine 10, sensors 61–65 which are used mainly for the control of the air conditioner 50, an engine controller 70 which generally controls operation of the engine 10, and an air conditioner controller 80 which controls operation of the air conditioner 50.

The engine 10 is accompanied by an air intake pipe 20 by which external air is introduced through an air cleaner (not shown), and an exhaust pipe 30 by which exhaust gas produced by the combustion of fuel in the engine 10 is discharged.

Major system components attached on the air intake pipe 20 are a fuel injector 21 which injects fuel into the air flow to produce the mixture to be fed to the engine 10, a throttle valve 22 which controls the quantity of introduced air, a throttle opening sensor 23 which detects the degree of opening TA of the throttle valve 22, and a suction air pressure sensor 24 which detects the air pressure PM inside the air intake pipe 20.

Major system components attached on the exhaust pipe 30 are a catalytic converter (C.C.) 31 which detoxifies or purifies the exhaust gas by means of the three-way catalyst mentioned previously, and an air-fuel ratio sensor 32 which is used to measure the air-fuel ratio A/F of the mixture based on the oxygen concentration in the exhaust gas.

Major system components attached on the engine 10 are a rotation sensor 12 which detects the number of revolutions or engine speed Ne of the engine output shaft (crankshaft) 11, and a coolant temperature sensor (not shown).

The number of revolutions Ne of the engine detected by the rotation sensor 12, the throttle opening TA detected by the throttle opening sensor 23, the suction air pressure PM detected by the suction air pressure sensor 24, and the air-fuel ratio A/F detected by the air-fuel sensor 32 are delivered to the engine controller 70, by which the quantity of fuel to be injected at each moment by the fuel injector 21 is determined in accordance with these detected values.

A compressor 51 of air conditioner 50 receives the output torque of drive shaft 11 of engine 10 through magnetic clutch 40, which is turned on or off by a control command of the engine controller 70 so that the air conditioner 50 is turned on or off.

The air conditioner 50 is a closed circuit made up of compressor 51, condenser 52, receiver 53, expansion valve 54 and an evaporator 55. These devices operate to implement a refrigeration cycle, in which circulating refrigerant absorbs the heat of the vehicle interior at the evaporator 55 and discharges the heat into the atmosphere at condenser 52. The evaporator 55 has an associated blower 55a which causes the air flow to circulate in the vehicle interior, and the condenser 52 has an associated fan 52a which fans it with external air.

The sensors used mainly for control of air conditioner 50 include an exterior air temperature sensor 61, evaporator output air temperature sensor 62, interior air temperature sensor 63, sun light or solar sensor 64 which detects the strength of sun light, and a vehicle speed sensor 65.

The output signals of these sensors are delivered to the air conditioner controller 80, by which the degree of necessity of air conditioning (will be termed simply "demand factor" hereinafter) is calculated. The air conditioner controller 80 further receives a signal from the air conditioner switch (not shown) located on the vehicle's dashboard, and sends it to the engine controller 70.

Figure 2:
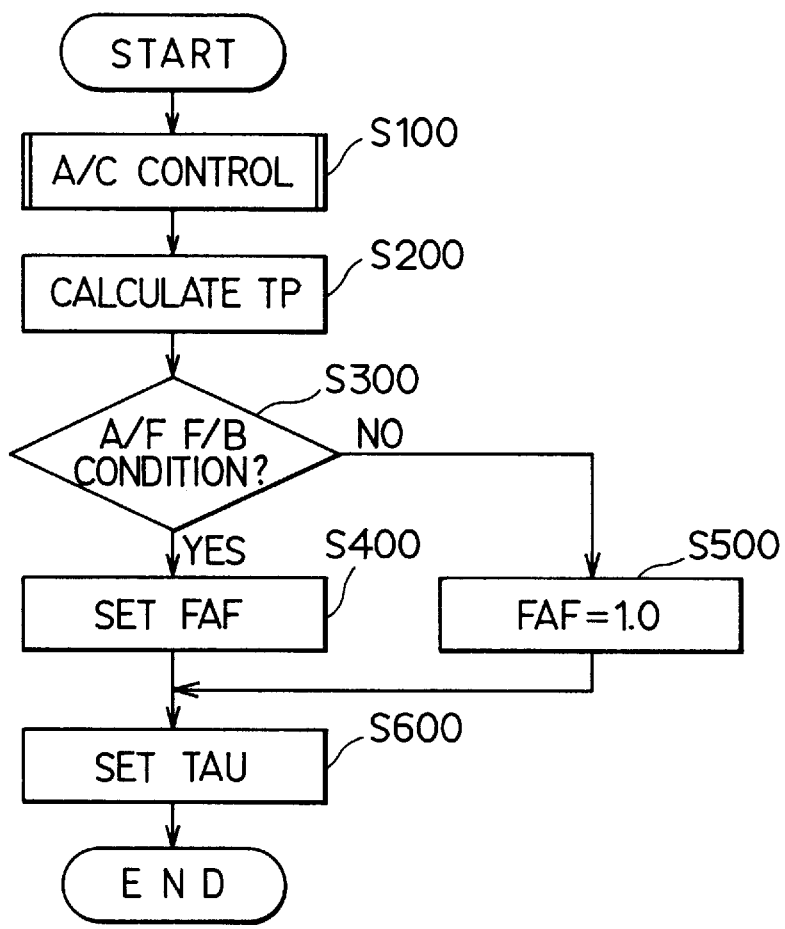
FIG. 2 is a flowchart of the engine control operation based on a first embodiment of this invention.
Figure 3:
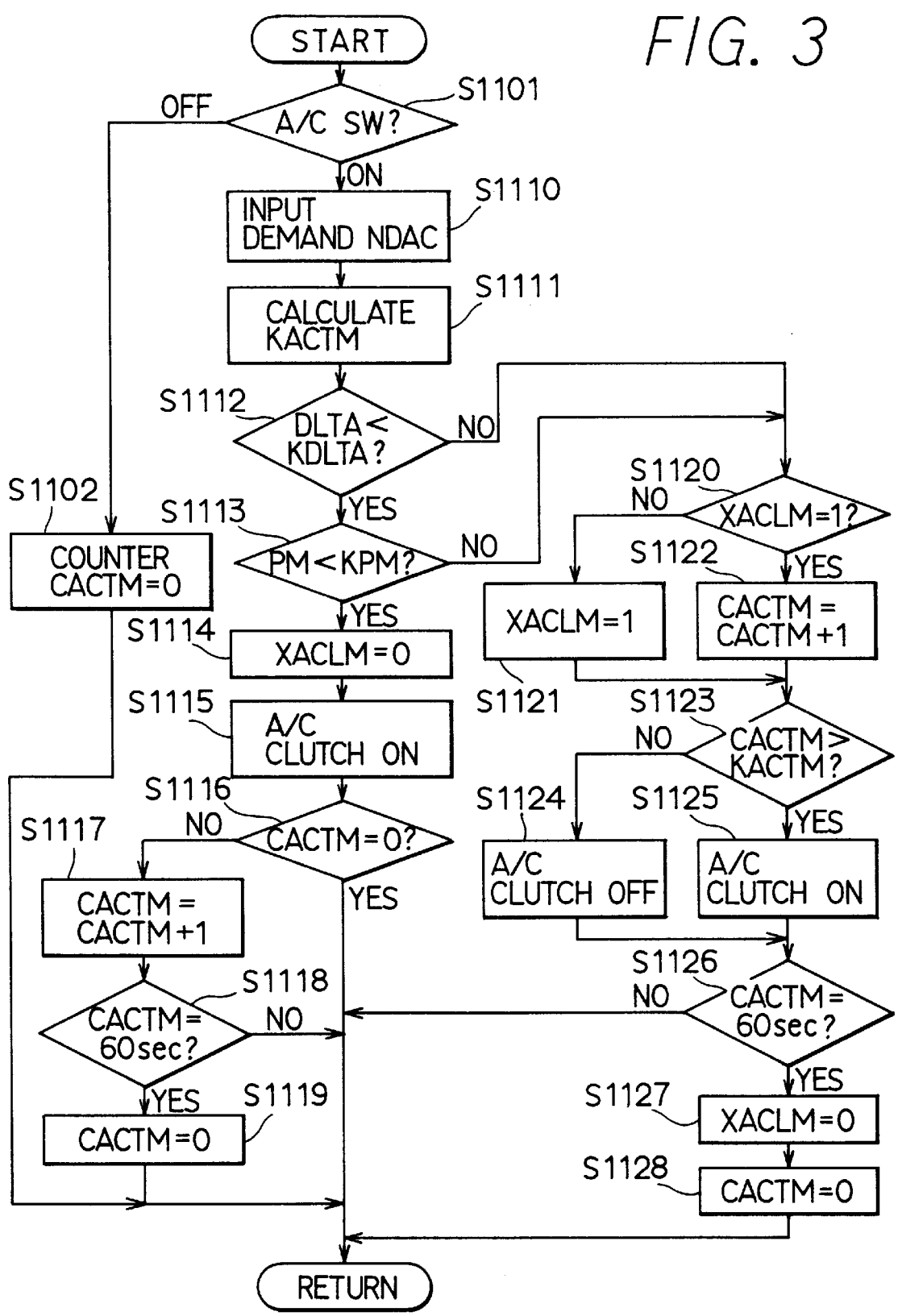
FIG. 3 is a detailed flowchart of the engine control routine in FIG. 2.

FIG. 2 and FIG. 3 show the control operation of engine 10 and air conditioner 50 carried out by engine controller 70 and air conditioner controller 80.

First, feedback control of the air-fuel ratio for engine 10 by engine controller 70 will be briefly explained in connection with FIG. 2. This control is carried out in the form of a timer interrupt routine which is executed at an interval of 16 ms for example by a microcomputer in engine controller 70.

The first step S100 of the routine is the execution of air conditioner control based on the command and information provided by the air conditioner controller 80, and it will be explained in detail later with reference to the flowchart of FIG. 3.

The next step S200 calculates the base fuel injection value TP from the information Ne and PM provided by engine rotation sensor 12 and suction air pressure sensor 24.

The next step S300 determines as to whether or not air-fuel ratio feedback conditions: (1) engine coolant temperature is 80° C. or higher, (2) the engine is not in a state of fuel-cut, and (3) the engine is not in a state of increased fuel supply for acceleration or heavy load, are met simultaneously.

If the conditions of step S300 are met, the next step S400 sets an air-fuel ratio correcting factor FAF for bringing the air-fuel ratio A/F detected by the air-fuel sensor 32 to the stoichiometric air-fuel ratio mentioned previously, and the control sequence proceeds to step S600.

If otherwise the conditions of step S300 are not met, the next step S500 sets the air-fuel ratio correcting factor FAF to 1.0 indicative of the stopping of air-fuel ratio feedback correction, and the control sequence proceeds to step S600.

The following step S600 sets a final fuel injection value TAU which is calculated by modifying the base fuel injection value TP by the air-fuel ratio correcting factor FAF and another correcting factor FALL that is based on the suction air temperature, the transition of engine condition, the battery voltage and the like, as follows.

$$TAU = TP \times FAF \times FALL \tag{1}$$

The fuel injector 21 is operated in accordance with the calculated fuel injection value TAU. The fuel injection routine (crank angle interrupt routine) which is known well in the art is not explained for brevity.

Next, the air conditioner control of step S100 will be explained with reference to FIG. 3. This control routine is a timer interrupt routine which is executed at an interval of 128 ms for example by microcomputer in engine controller 70.

The first step S1101 receives the signal of the air conditioner switch from air conditioner controller 80. If the switch signal is "off", the following step S1102 clears the CACTM counter and terminates the routine. If otherwise the switch signal is "on", the engine controller 70 proceeds to the following air conditioner control.

Step S1110 receives the demand factor NDAC (degree of necessity of air conditioning) from air conditioner controller 80. The NDAC value is calculated in the manner shown in FIG. 4. Specifically, vehicle interior temperature Ta detected by sensor 63 is reduced by the target temperature Tb to evaluate differential temperature T, and it is converted into a percentage value based on a reference differential temperature To. For example, when target temperature Tb is 20° C. and detected interior temperature Ta is 40° C., the differential temperature (T) 20° C. is compared with the reference differential temperature (To) 10° C. to derive the corresponding NDAC value.

Figure 5:
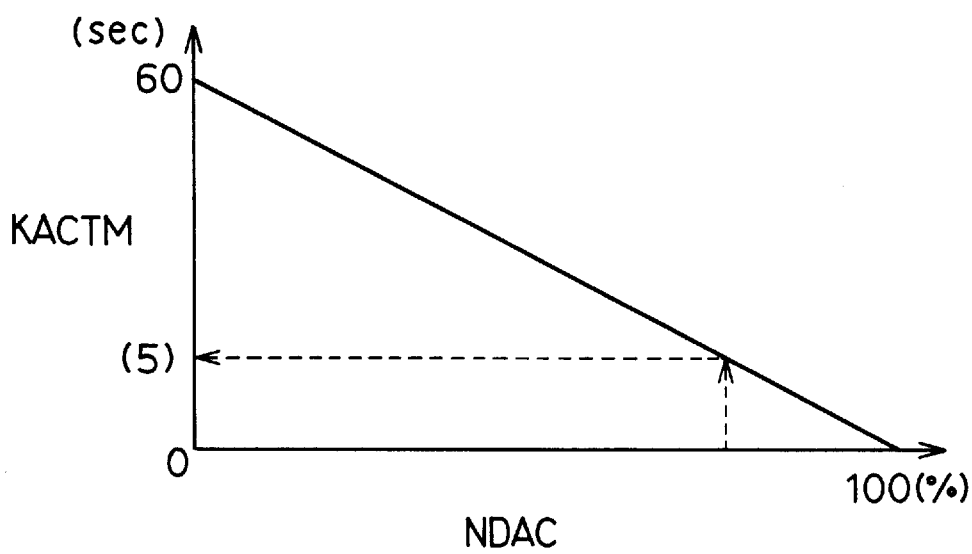
FIG. 5 is a graph showing a manner of calculation of the air conditioner operation restriction factor KACTM.

The next step S1111 calculates the restriction factor KACTM relevant to the NDAC value in the manner shown in FIG. 5. Specifically, restriction factor KACTM is calculated in terms of a time length in seconds in which operation of air conditioner 50 is suspended within a period of 60 seconds. The KACTM value is inversely proportional to the NDAC value.

The subsequent steps S1112 and S1113 verify the operational states of engine 10. Specifically, step S1112 detects a state of acceleration of the engine by differentiating with time throttle opening TA provided by throttle opening sensor 23 and comparing the resulting value DLTA with the prescribed threshold value KDLTA, and step S1113 detects a heavy-load state of the engine by comparing suction air pressure PM provided by suction air pressure sensor 24 with the prescribed threshold value KPM.

If the engine operation is not in the acceleration state nor heavy-load state, the next step S1114 resets the air conditioning restriction flag XACLM to "0", and subsequent step S1115 turns on magnetic clutch 40 so that air conditioner 50 operates without any restriction. Subsequently, engine controller 70 verifies whether time counter CACTM is cleared (step S1116), increments the CACTM counter if it is not cleared (step S1117), clears the CACTM counter when the count value indicates a reference time length of 60 seconds that is the restriction factor KACTM (steps S1118 and S1119), and thereafter terminates the routine.

If otherwise the engine operation is in the acceleration state or heavy-load state, the next step S1120 verifies the air conditioning restriction flag XACL. If the XACL flag is not in the set state, the next step S1121 sets it to "1". If otherwise the XACL flag is already set to "1", the next step S1122 increments the CACTM counter.

The subsequent step S1123 compares the count value of CACTM with the restriction factor KACTM. The engine controller 70 keeps magnetic clutch 40 off (step S1124) until the count value of CACTM exceeds the restriction factor KACTM, at which the engine controller 70 turns on magnetic clutch 40 (step S1125). The count value of CACTM is monitored continuously in subsequent step S1126, and when it reaches the value corresponding to 60 seconds, the air conditioning restriction flag XACLM is reset to "0" (step S1127) and the CACTM counter is cleared to "0" (step S1128).

The foregoing air conditioner control routine is executed cyclically, and during accelerating operation or heavy-load operation of the engine, operation of the air conditioner 50 is suspended for a time length indicated by the restriction factor KACTM out of a 60-second period.

According to the first embodiment, air conditioner 50 is allowed to operate without any restriction when engine 10 is running in a steady state, and its operation is restricted properly depending on the demand factor NDAC if the exhaust gas detoxification performance of catalytic converter 31 is expected to deteriorate during acceleration or heavy-load operation of the engine in which the air-fuel ratio feedback control is stopped and fuel quantity is increased (S500 in FIG. 2). Consequently, engine load is prevented from becoming excessive during acceleration or heavy-load operation so as to retain satisfactory detoxification performance of catalytic converter 31, while allowing air conditioner 50 to exert limited performance.

By finding an optimal matching condition between the demand factor NDAC and restriction factor KACTM, it becomes possible to minimize the aggravation of toxic exhaust gas emission caused by operation of air conditioner 50.

The manner of restriction of the air conditioner operation is arbitrary, and is not confined to the 60-second based duty cycle corresponding to KACTM.

(Embodiment 2)

Figure 6:
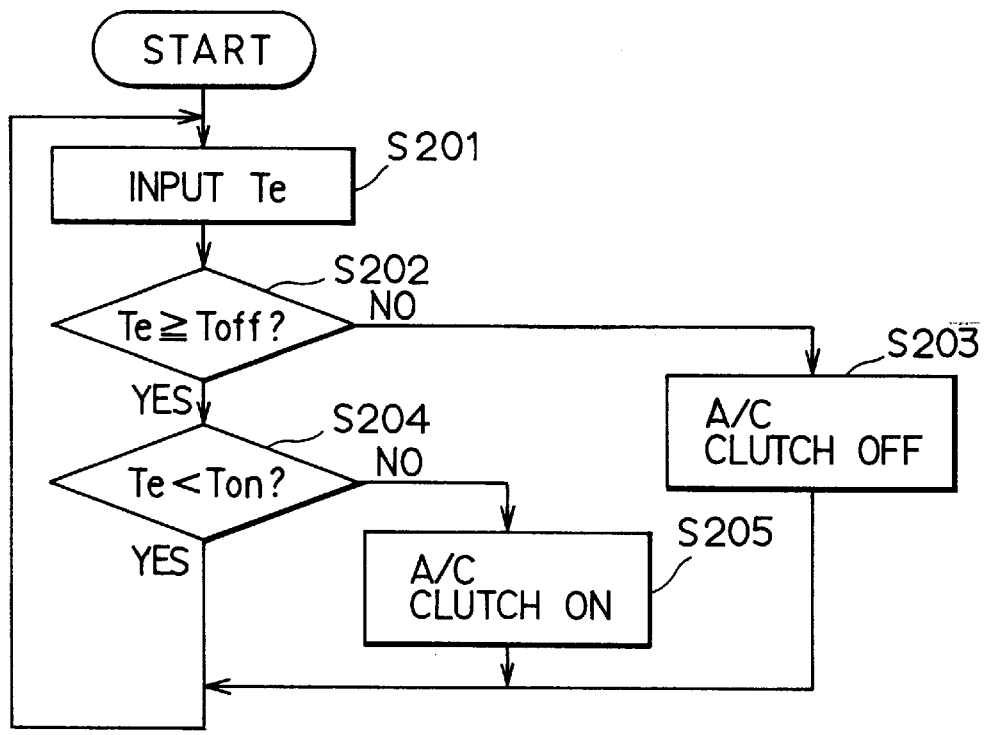
FIG. 6 is a flowchart showing the on/off control of the air conditioner used in general.
Figure 7:
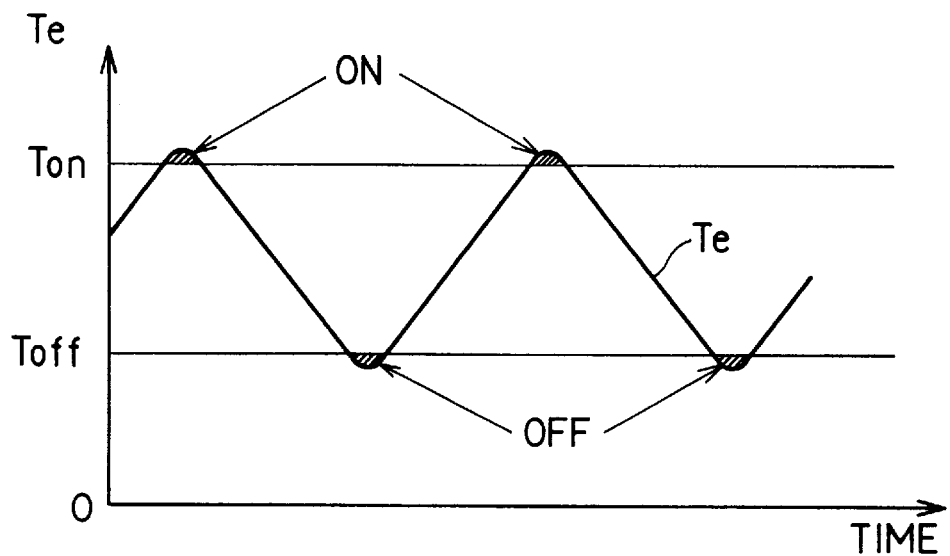
FIG. 7 is a timing chart showing the turn-on and turn-off operations of the air conditioner based on the control of FIG. 6.

Many air conditioners installed on land motor vehicles are controlled to turn on and off automatically depending on the air temperature Te at the output of evaporator 55, as shown in FIG. 6 and FIG. 7. The control operation takes place in response to the evaporator output air temperature Te relative to a preset air conditioner turn-on temperature Ton and turn-off temperature Toff as shown by the flowchart of FIG. 6.

The controller samples the evaporator output air temperature Te (step S201). If the temperature Te is below the turn-off temperature Toff (step S202), the controller turns off the magnetic clutch 40 of air conditioner compressor 51 (step S203), or if the temperature Te is above the turn-on temperature Ton (step S204), the controller turns on the magnetic clutch (step S205). Otherwise, the magnetic clutch is kept on or off.

Figure 8:
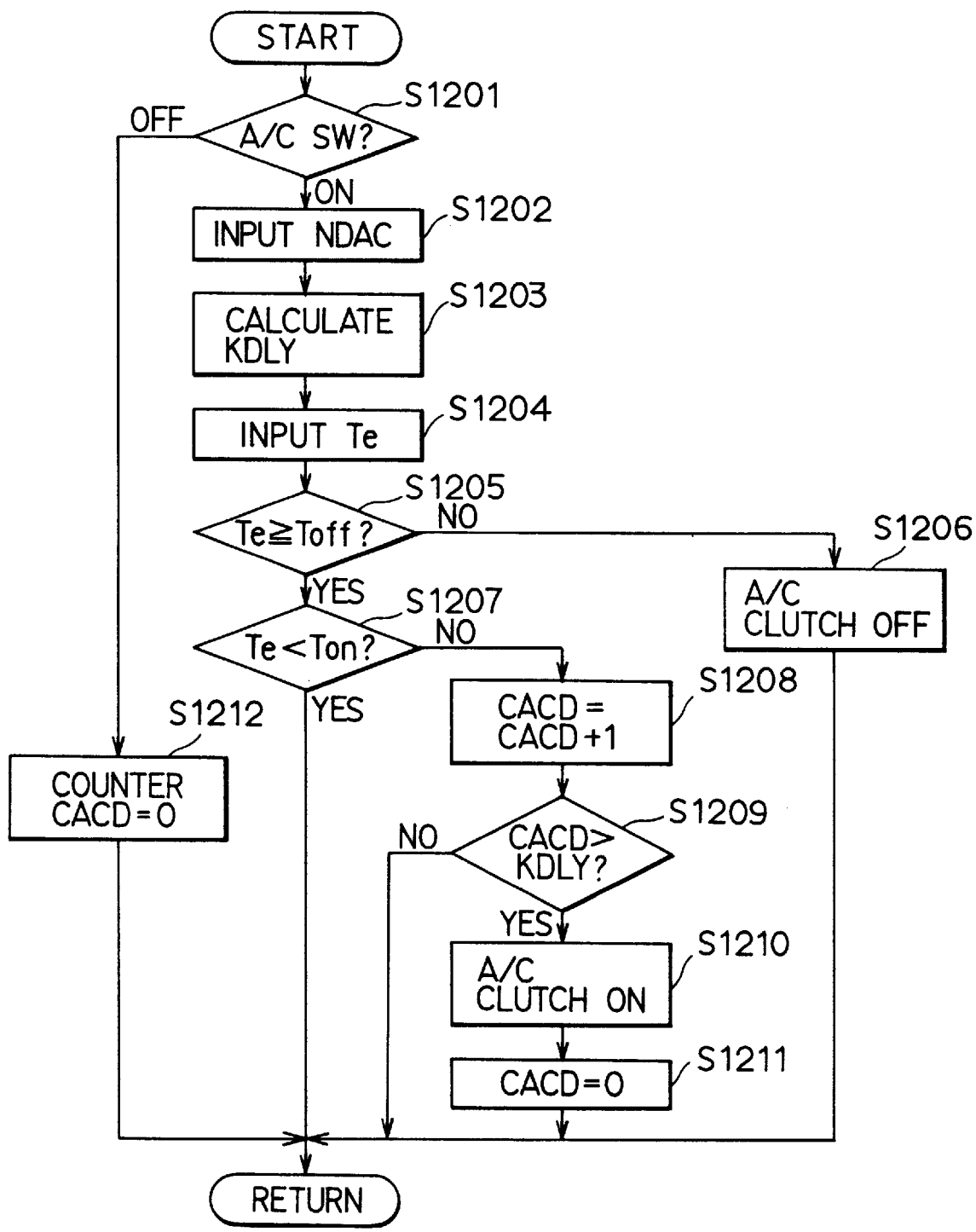
FIG. 8 is a flowchart of the engine control operation based on a second embodiment of this invention.

FIG. 8 shows by flowchart an exhaust gas detoxifying system based on the second embodiment of this invention which operates to restrict air conditioner operation in accordance with the above-mentioned switching control of FIG. 6.

The basic arrangement of the system is identical to that shown in FIG. 1, with the air-fuel ratio feedback control for engine 10 by engine controller 70 being implemented as the execution of the control routine shown in FIG. 2. The control routine shown in FIG. 8 is a variant version of the air conditioner control of step S100 in FIG. 2, which is carried out as a timer interrupt routine at an interval of 128 ms for example by the engine controller 70.

The first step S1201 receives the signal of the air conditioner switch from the air conditioner controller 80. If the switch signal is "off", the following step S1212 clears the CACD counter and terminates the routine. If otherwise the switch signal is "on", the engine controller 70 proceeds to the following air conditioner control.

Step S1202 receives the air conditioning demand factor NDAC from air conditioner controller 80. The NDAC value is calculated in the manner shown in FIG. 4 as in the preceding embodiment.

Figure 9:
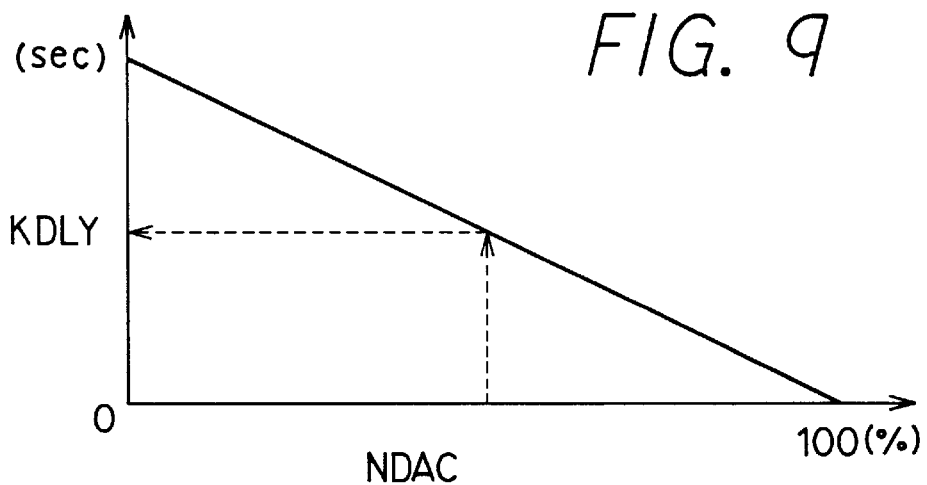
FIG. 9 is a graph showing a manner of calculation of the air conditioner operation restriction factor (delay time) KDLY.

The next step S1203 calculates the restriction factor KDLY relevant to the NDAC value. Specifically, the restriction factor KDLY is a delay time measured in seconds imposed on turn-on transition of the air conditioner 50 in connection with the above-mentioned switching control, and it is inversely proportional to the NDAC value as shown in FIG. 9.

The next step S1204 receives the evaporator output air temperature Te, and the subsequent step S1205 determines whether temperature Te is higher than or equal to the preset turn-off temperature Toff (FIG. 7). If temperature Te is below Toff, the next step S1206 turns off magnetic clutch 40. If temperature Te is Toff or higher, the subsequent step S1207 determines whether the temperature Te is below the preset turn-on temperature Ton (FIG. 7).

In case evaporator output air temperature Te is Ton or higher, engine controller 70 increments the CACD counter which counts the delay time (step S1208). It compares the count value of CACD with the calculated restriction factor (delay time) KDLY (step S1209), and keeps magnetic clutch 40 off unless the CACD value has exceeded the KDLY value. When the CACD value exceeds the KDLY value, the controller 70 turns on magnetic clutch 40 (step S1210), and thereafter clears the CACD counter (step S1211).

As a result of the air conditioner control by engine controller 70, the turn-on operation of air conditioner 50 is delayed by a time length which corresponds to the demand factor NDAC. Consequently, when the air conditioning demand factor NDAC is small, the increase of engine load caused by operation of the air conditioner can be alleviated properly.

Although the control routine of FIG. 8 does not comprehend the operational state of engine 10, the turn-on delay control for air conditioner 50 (magnetic clutch 40) based on this embodiment may be modified to take place only during accelerating or heavy-load operation of engine 10 in which air-fuel ratio feedback control is stopped, as in the case of the first embodiment.

(Embodiment 3)

Figure 10:
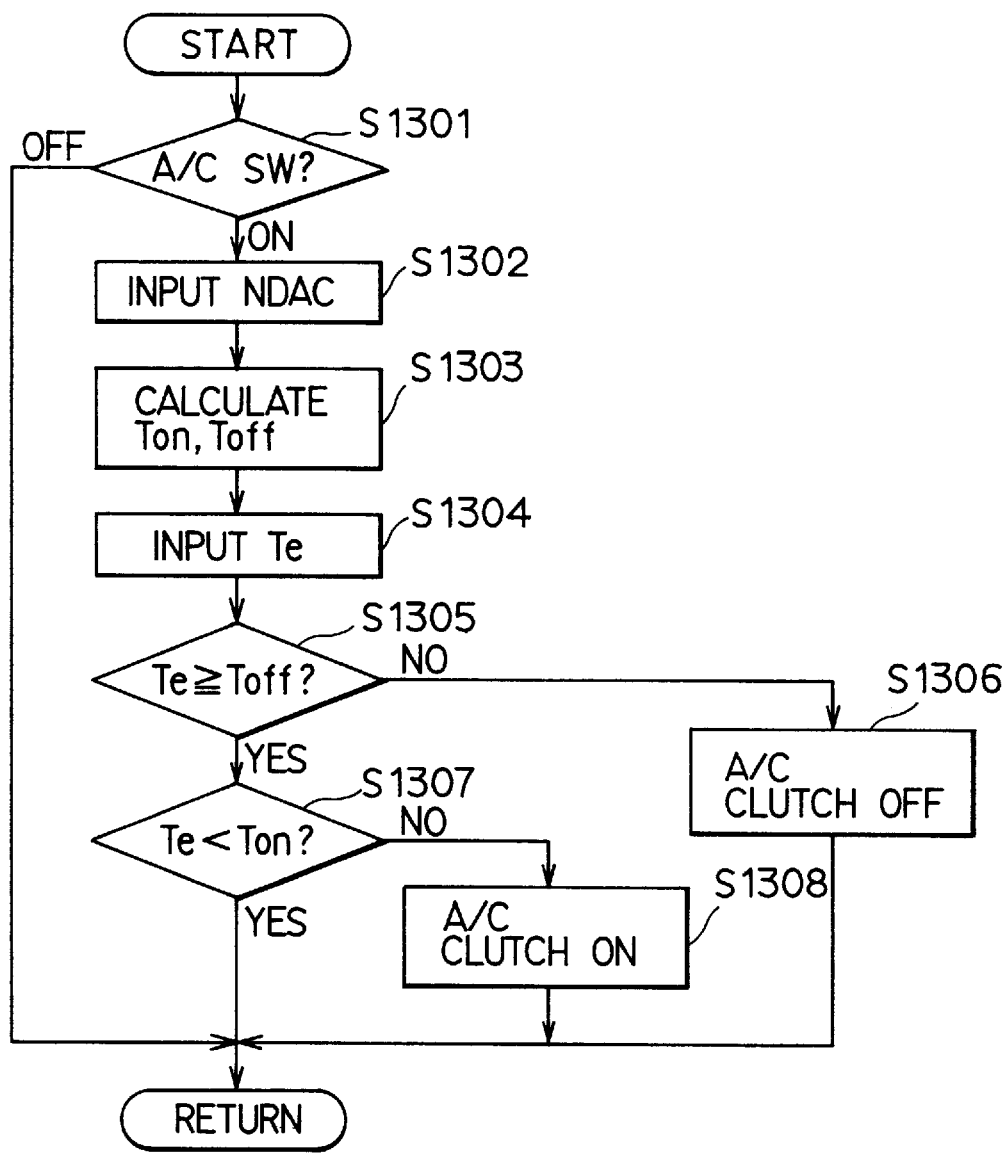
FIG. 10 is a flowchart of the engine control operation based on a third embodiment of this invention.

FIG. 10 shows by flowchart exhaust gas detoxifying system based on the third embodiment of this invention, which operates to restrict the operation of the air conditioner by setting an air conditioner turn-on temperature Ton and turn-off temperature Toff variably in response to the air conditioning demand factor NDAC.

The control routine shown in FIG. 10 is a variant version of the air conditioner control of step S100 in FIG. 2, which is carried out as a timer interrupt routine at an interval of 128 ms for example by engine controller 70.

The first step S1301 receives the signal of the air conditioner switch from air conditioner controller 80. If the switch signal is "off", the control sequence goes out of the routine. If the switch signal is "on", engine controller 70 proceeds to the following air conditioner control.

Step S1302 receives the air conditioning demand factor NDAC from air conditioner controller 80.

Figure 11A:
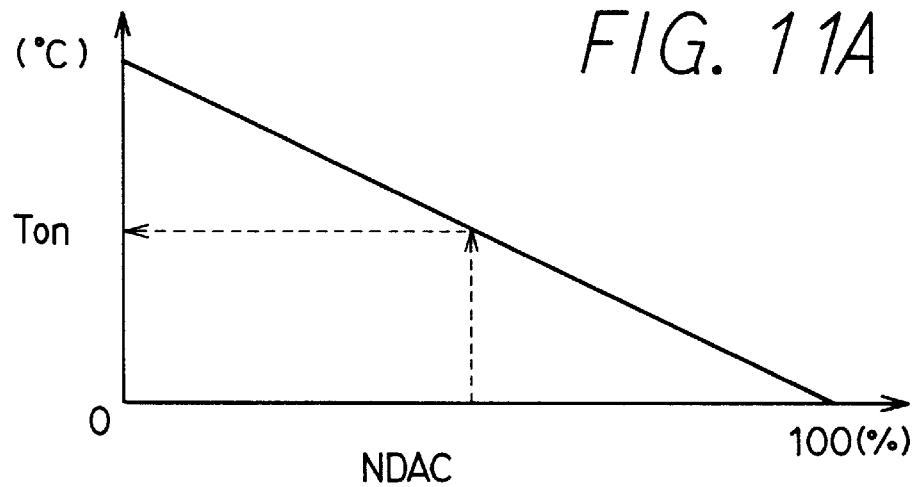
FIGS. 11A and 11B are graphs showing a manner of calculation of the air conditioner turn-on temperature Ton and turn-off temperature Toff.
Figure 11B:
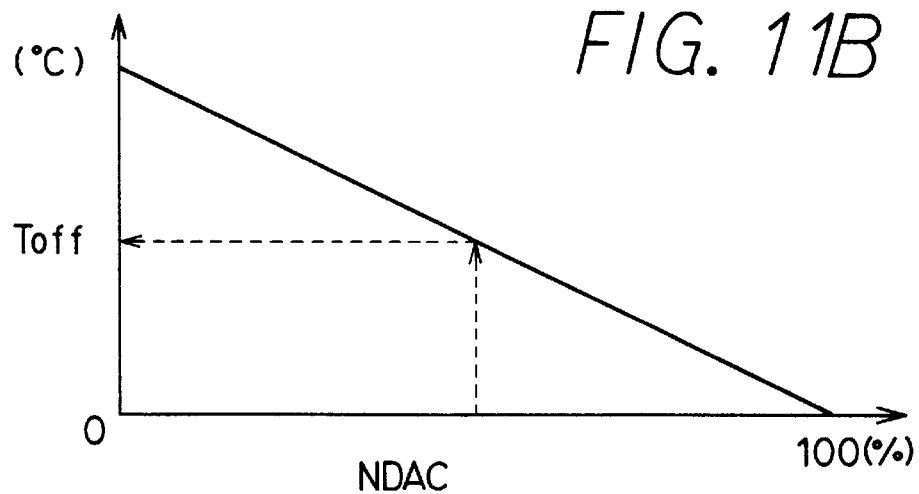

The next step S1303 calculates turn-on temperature Ton and turn-off temperature Toff in accordance with the demand factor NDAC in the manner shown in FIGS. 11A and 11B. Namely, turn-on temperature Ton and turn-off temperature Toff are set lower for a smaller demand factor NDAC, and set higher for a larger demand factor NDAC. Accordingly, the greater the NDAC value, the earlier is the turn-on of air conditioner 50 (magnetic clutch 40) in the operation cycle. The smaller the NDAC value, the later is the turn-on of air conditioner 50 (magnetic clutch 40) in the operation cycle.

The next step S1304 receives the evaporator output air temperature Te from thermal sensor 62, and the subsequent step S1305 determines whether temperature Te is the calculated turn-off temperature Toff or lower. If Te is below Toff, the next step S1306 turns off magnetic clutch 40. If Te is at Toff or higher, the next step S1307 determines whether temperature Te is below the calculated turn-on temperature Ton. If Te is at Ton or above, the next step S1308 turns on magnetic clutch 40.

Consequently, when the air conditioning demand factor NDAC is small, the increase of engine load caused by operation of air conditioner can be alleviated properly.

This embodiment can be modified to operate based on the calculated air conditioner turn-on temperature Ton and turn-off temperature Toff only during accelerating or heavy-load operations of engine 10 in which air-fuel ratio feedback control is stopped, as in the cases of the preceding embodiments.

(Embodiment 4)

Figure 12:
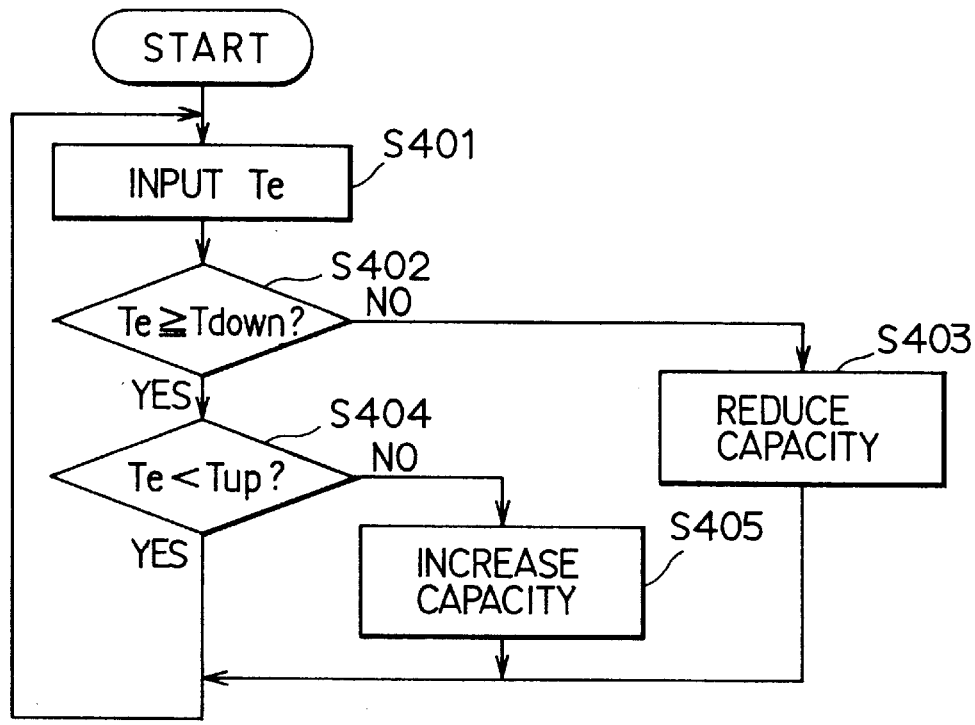
FIG. 12 is a flowchart showing the air conditioner output control used in general.
Figure 13:
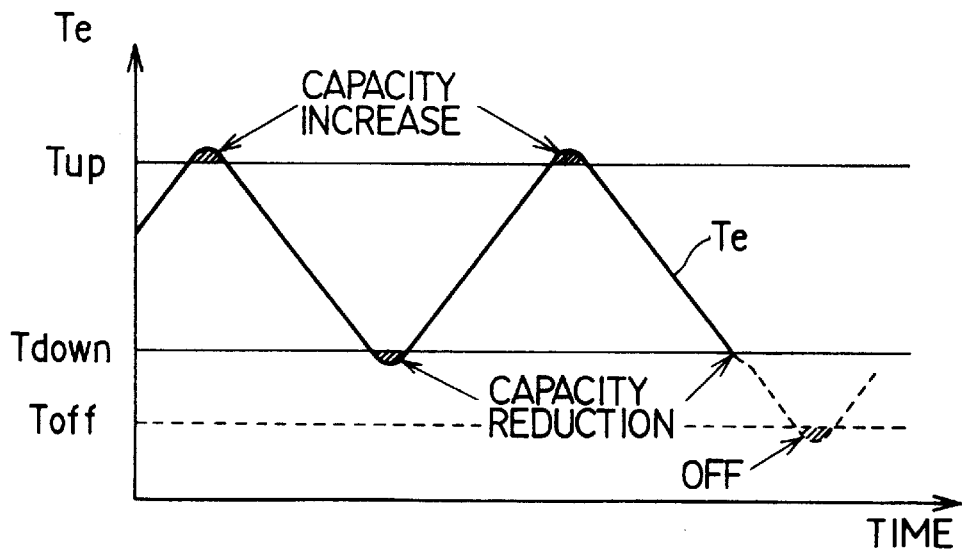
FIG. 13 is a timing chart showing the variable air conditioner output based on the control of FIG. 12.

Many air conditioners have compressors of variable capacity, and have their compressor capacity controlled to increase or decrease automatically depending on evaporator output air temperature Te, as shown in FIG. 12 and FIG. 13.

Specifically, in the flowchart of FIG. 12, the controller initially receives the evaporator output air temperature Te (step S401). If temperature Te is below a preset compressor down-capacity temperature Tdown (step S402), the controller reduces compressor capacity (step S403). If the temperature Te is at a preset compressor up-capacity temperature Tup or higher (step S404), the controller increases compressor capacity (step S405) Otherwise, compressor capacity is kept unchanged.

As a modified control scheme, if the evaporator output air temperature Te has fallen below the turn-off temperature Toff mentioned previously, the controller may turn off the magnetic clutch 40 of air conditioner 50, as shown by the dashed line in FIG. 13.

Figure 14:
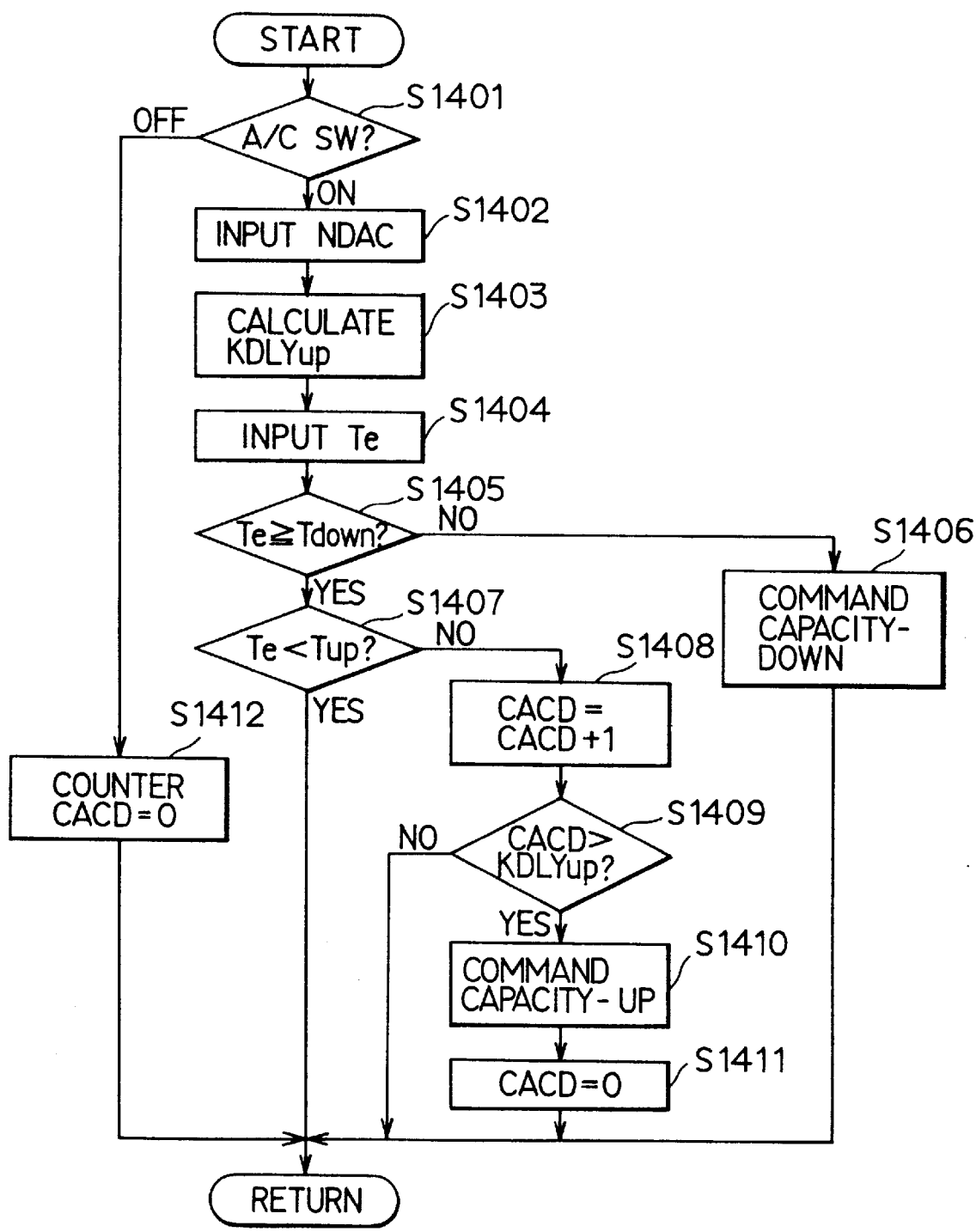
FIG. 14 is a flowchart of the engine control operation based on a fourth embodiment of this invention.

FIG. 14 shows by flowchart an exhaust gas detoxifying system based on the fourth embodiment of this invention which operates to restrict air conditioner operation in terms of compressor capacity.

The basic arrangement of the system is identical to that shown in FIG. 1, with solenoid 51a being added to vary compressor capacity in a known manner in accordance with signal from the air conditioner controller 80 produced in response to a capacity control command from engine controller 70, as shown by the dashed line in FIG. 1.

The engine controller 70 implements the air-fuel feedback control for engine 10 in accordance with the control routine shown in FIG. 2. The control routine shown in FIG. 14 is a variant version of the air conditioner control of step S100 in FIG. 2, which is carried out as a timer interrupt routine at an interval of 128 ms for example by engine controller 70.

The first step S1401 receives the signal of the air conditioner switch from air conditioner controller 80. If the switch signal is "off", the following step S1412 clears the CACD counter and terminates the routine. If the switch signal is "on", engine controller 70 proceeds to the following air conditioner control.

Step S1402 receives the air conditioning demand factor NDAC from air conditioner controller 80. The next step S1403 calculates a restriction factor (delay time) KDLYup which depends on the NDAC value in the same manner as the delay time KDLY of the second embodiment shown in FIG. 9. The delay time KDLYup measured in seconds is inversely proportional to the air conditioning demand factor NDAC, and is imposed on the timing of an increase in compressor capacity.

The next step S1404 receives the evaporator output air temperature Te from thermal sensor 62, and the subsequent step S1405 determines as to whether temperature Te is at the preset down-capacity temperature Tdown or lower (FIG. 13). If Te is below Tdown, the next step S1406 issues a compressor capacity-down command to air conditioner controller 80. If otherwise Te is Tdown or higher, the next step S1407 determines whether temperature Te is below the preset capacity-up temperature Tup (FIG. 13).

In case the temperature Te is at Tup or higher, engine controller 70 increments the CACD counter which counts the delay time (step S1408). It compares the count value of CACD with the calculated restriction factor (delay time) KDLYup (step S1409), and retains the compressor capacity unless the CACD value has exceeded the KDLYup value. When the CACD value exceeds KDLYup value, the controller 70 issues a compressor capacity-up command to air conditioner controller 80 (step S1410), and thereafter clears the CACD counter (step S1411).

As a result of the air conditioner control by engine controller 70, the compressor capacity-up operation of air conditioner 50 is delayed by a time length which corresponds to the demand factor NDAC. Consequently, when the air conditioning demand factor NDAC is small, the increase of engine load caused by operation of the air conditioner can be alleviated properly.

Although the control routine of FIG. 14 does not comprehend operational state of the engine 10, the compressor capacity-up delay control for air conditioner 50 based on this embodiment may be modified to take place only during accelerating or heavy-load operations of engine 10, as in the case of the first embodiment.

As a modified control scheme, if evaporator output air temperature Te has fallen below turn-off temperature Toff mentioned previously, the controller may turn off magnetic clutch 40 of air conditioner 50, as shown by the dashed line in FIG. 13.

As another modified control scheme, the compressor capacity-up temperature Tup and capacity-down temperature Tdown may be calculated based on the value of air conditioning demand factor NDAC, as in the case of the third embodiment.

In the foregoing second, third and fourth embodiments, evaporator output air temperature Te used for switching magnetic clutch 40 or the capacity of air conditioner compressor 51 may be substituted for by the temperature of refrigerant at the output of the evaporator.

Figure 4:
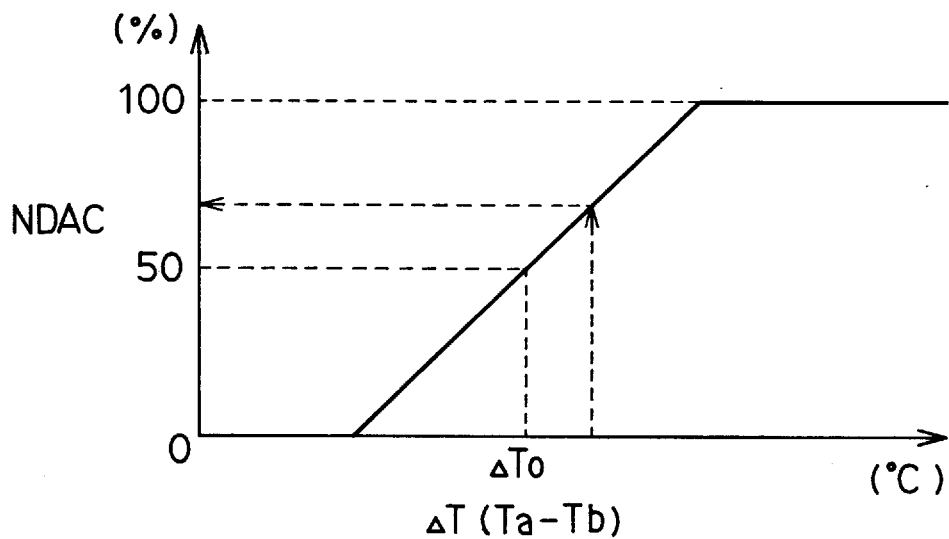
FIG. 4 is a graph showing a manner of calculation of the degree of necessity of air conditioning.

The air conditioning demand factor NDAC, which is calculated based on the differential temperature T of vehicle interior temperature Ta from target temperature Tb in any of the foregoing first through fourth embodiments as shown in FIG. 4, may be evaluated in different manners.

Figure 15A:
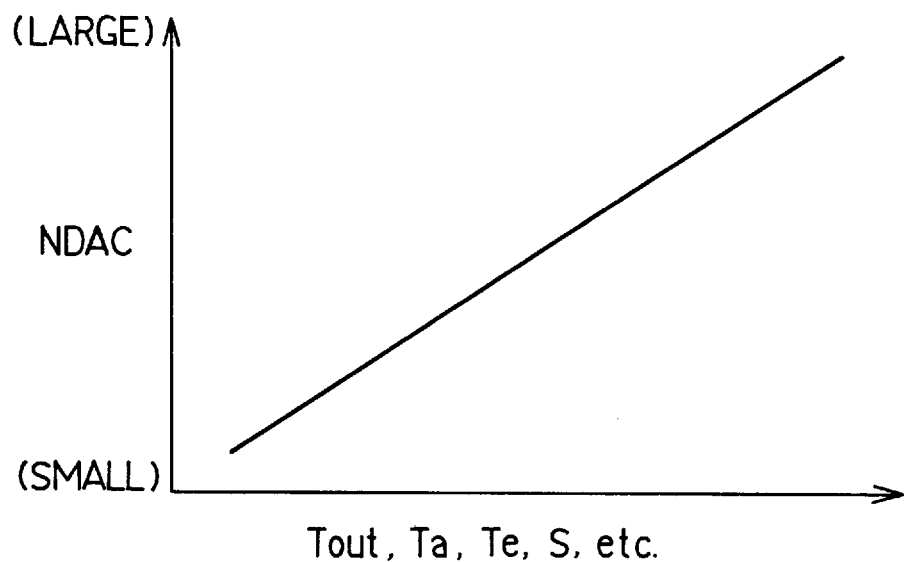
FIGS. 15A and 15B are graphs showing another manner of calculation of the degree of necessity of air conditioning.

It can be assumed that the higher or greater the vehicle exterior temperature Tout, the vehicle interior temperature Ta, the evaporator output air temperature Te, the sun light strength S, the ventilator output air temperature, the evaporator air flow rate, the compressor output pressure, the compressor input pressure, the evaporator output superheating, or the compressor duty cycle, the greater will be the air conditioning demand factor NDAC. Accordingly, the air conditioning demand factor NDAC may be calculated to be proportional to at least one of these operational parameters as shown in FIG. 15A.

Figure 15B:
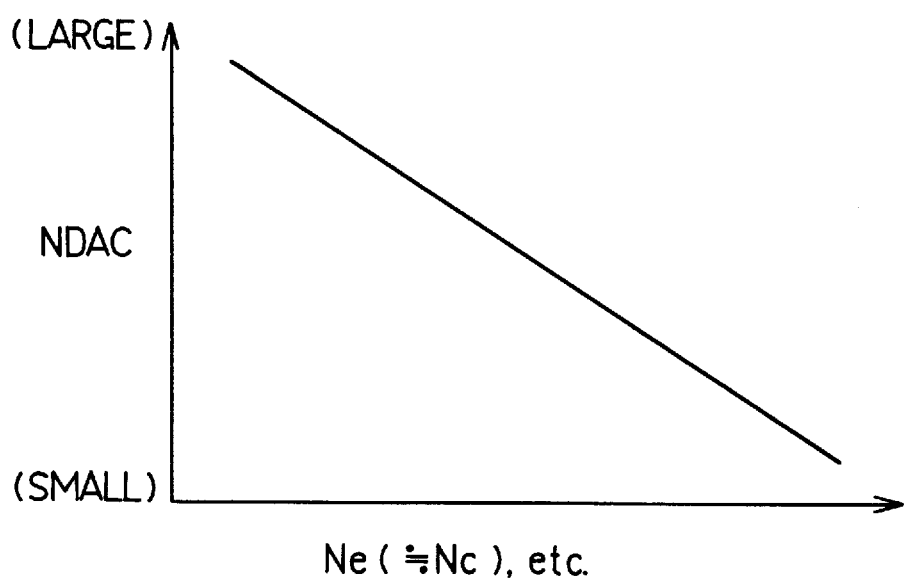

It can also be assumed that the higher or greater the number of revolutions Ne of engine (or revolutions Nc of compressor), the condenser air flow rate or flow velocity, or the quantity of evaporator frost, the smaller will be the air conditioning demand factor NDAC. Accordingly, the air conditioning demand factor NDAC may be calculated to be inversely proportional to at least one of these operational parameters as shown in FIG. 15B.

Furthermore, the air conditioning demand factor NDAC may be calculated in consideration of the degree of acceleration or the degree of heavy-load state of engine 10.
(Embodiment 5)

The turn-on or turn-off transition of the air conditioner causes engine load to vary and the air-fuel ratio to fluctuate. On this account, if the air conditioner is turned on or off during engine operation, with the air-fuel ratio being already disturbed, this air conditioner switching action can possibly aggravate the fluctuation of air-fuel ratio.

Figure 16:
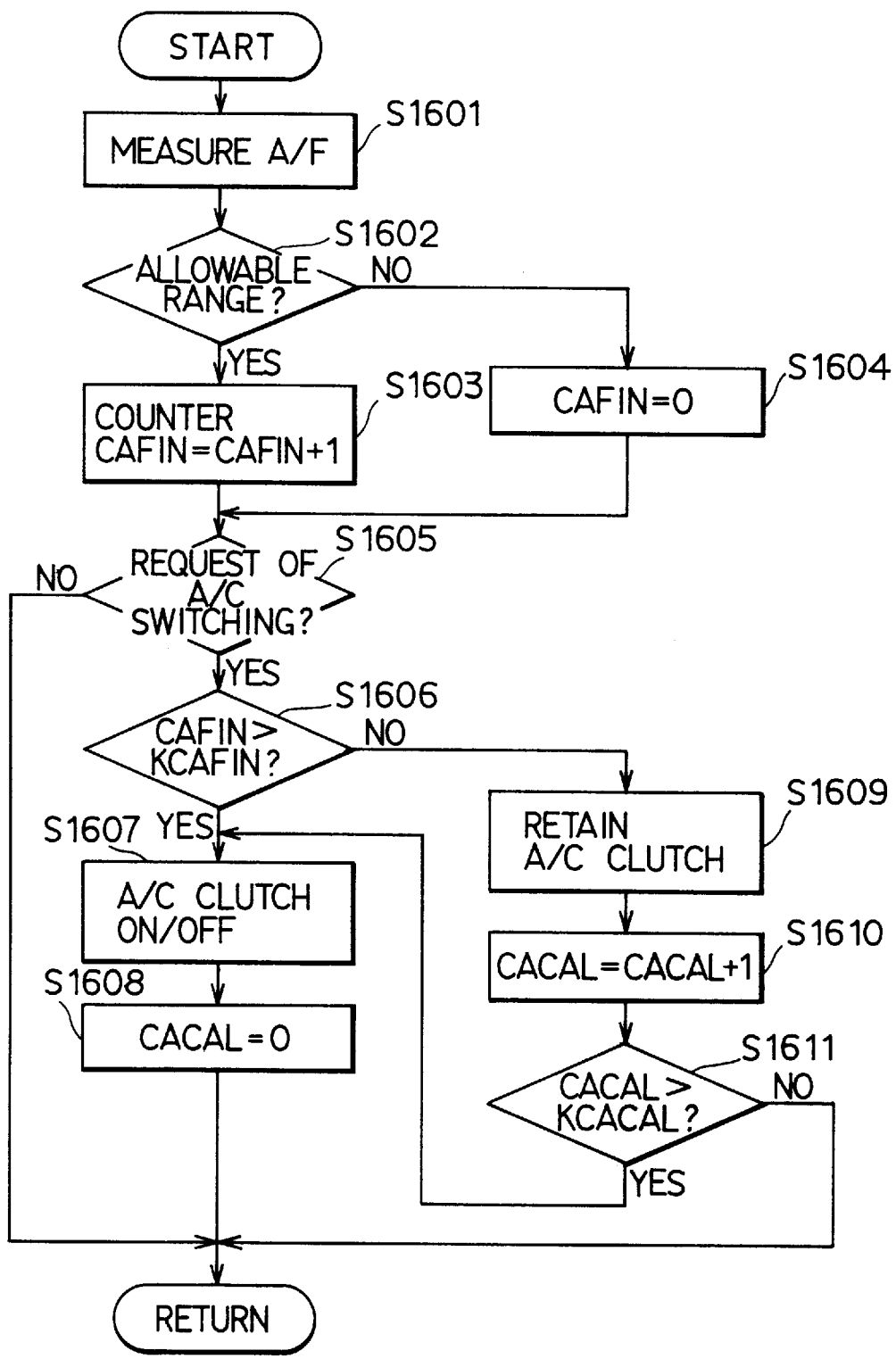
FIG. 16 is a flowchart of the engine control operation based on a fifth embodiment of this invention.

FIG. 16 shows by flowchart an exhaust gas detoxifying system based on the fifth embodiment of this invention, which operates to inhibit switching of the air conditioner during a state of disturbance of the air-fuel ratio.

The basic arrangement of the system is identical to that shown in FIG. 1. The engine controller 70 implements the air-fuel ratio feedback control for engine 10 in accordance with the control routine shown in FIG. 2. The control routine shown in FIG. 16 is a variant version of the air conditioner control of step S100 in FIG. 2, which is carried out as a timer interrupt routine at an interval of 128 ms for example by engine controller 70.

The first step S1601 measures the air-fuel ratio A/F based on output of the air-fuel ratio sensor 32.

The next step S1602 determines whether the air-fuel ratio A/F is within the prescribed range of fluctuation. If the A/F is within the allowable range, the next step S1603 increments a counter CAFIN which counts the time length of A/F stabilization. If otherwise the A/F deviates over the allowable range, the next step S1604 clears the CAFIN counter.

The next step S1605 checks whether there is a request of turn-on or turn-off switching of air conditioner 50 from air conditioner controller 80. If there is no air conditioner switching request, engine controller 70 terminates the routine. If there is one of the air conditioner switching requests, the next step S1606 compares the value of CAFIN counter with a threshold value KCAFIN of air-fuel ratio.

If the CAFIN value is greater than the KCAFIN value, engine controller 70 grants the turn-on or turn-off switching of the air conditioner 50, i.e., magnetic clutch 40, (step S1607), and subsequently clears a counter CACAL which will be explained in the following (step S1608). If the CAFIN value does not exceed the threshold KCAFIN, the engine controller 70 retains the operational state of the air conditioner 50, i.e., magnetic clutch 40, (step S1609), and increments the CACAL counter which counts the time length of holding of the request (step S1610). On expiration of a threshold time length KCACAL for the count value of CACAL counter (step S1611), engine controller 70 grants the air conditioner switching operation (step S1607). This procedure is intended to avoid the permanent inhibition of the air conditioner turn-on request so that the vehicle interior temperature does not rise to excess.

Based on the foregoing control operation, the fluctuation of air-fuel ratio is prevented from being aggravated by switching of the air conditioner.

The inhibition of the air conditioner switching operation during engine operation in a state of fluctuating air-fuel ratio can be combined with the preceding first through fourth embodiments including the case of switching the capacity of the variable capacity compressor, and it becomes possible to cope with fluctuation of the air-fuel ratio with variation of engine load attributable to operation of the air conditioner.
(Embodiment 6)

Figure 17:
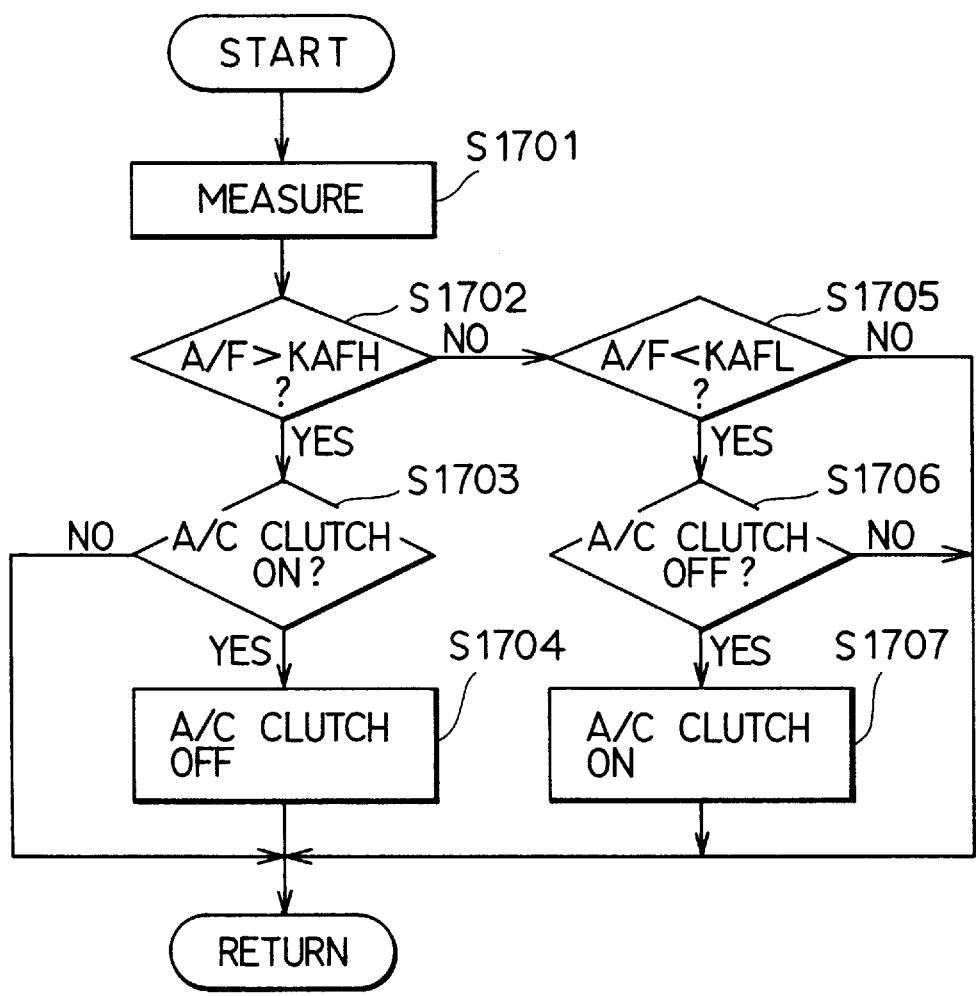
FIG. 17 is a flowchart of the engine control operation based on a sixth embodiment of this invention.

FIG. 17 shows by flowchart exhaust gas detoxifying system based on the sixth embodiment of this invention, which operates to control the air conditioner turn-on and turn-off operations depending on the state of air-fuel ratio thereby to restrict fluctuation of the air-fuel ratio.

The basic arrangement of the system is identical to that shown in FIG. 1. The engine controller 70 implements air-fuel ratio feedback control for engine 10 in accordance with the control routine shown in FIG. 2. The control routine shown in FIG. 17 is a variant version of the air conditioner control of step S100 in FIG. 2, which is carried out periodically by engine controller 70.

The first step S1701 measures the air-fuel ratio A/F based on the output of air-fuel ratio sensor 32.

The next step S1702 compares the measured air-fuel ratio A/F with the prescribed threshold value KAFH thereby to determine as to whether it is excessively lean. If the A/F is excessively lean and if the next step S1703 detects that magnetic clutch 40 is on, the subsequent step S1704 turns off magnetic clutch 40. The deactivation of the air conditioner 50 causes the air-fuel ratio to vary to the rich side as mentioned previously, and consequently the lean air-fuel ratio is corrected.

If the A/F is not on the lean side in step S1702, the next step S1705 compares the detected air-fuel ratio A/F with another prescribed threshold value KAFL thereby to determine as to whether it is excessively rich. If the A/F is excessively rich and if the next step S1706 detects that magnetic clutch 40 is off, the subsequent step S1707 turns on magnetic clutch 40. The activation of air conditioner 50 causes the air-fuel ratio to vary to the lean side as mentioned previously, and consequently the rich air-fuel ratio is corrected.

Namely, this embodiment is designed to alleviate fluctuation of the air-fuel ratio A/F by utilization of the operation of air conditioner switching operation on the variation of air-fuel ratio.

The air-fuel ratio A/F also varies in response to switching of the compressor capacity of the air conditioner, and accordingly it is possible to design a system with a variable-capacity air conditioner compressor to alleviate fluctuation of air-fuel ratio A/F by utilization of the operation of compressor capacity switching on the variation of air-fuel ratio.

The system of this embodiment can be combined with the preceding first through fourth embodiments.

(Embodiment 7)

Generally, a feedback control system has its control response enhanced by having a larger feedback gain, or has its control stability enhanced by having a smaller feedback gain. Based on this principle, the fluctuation of air-fuel ratio can be managed by manipulating the feedback gain of the control system.

Figure 18:
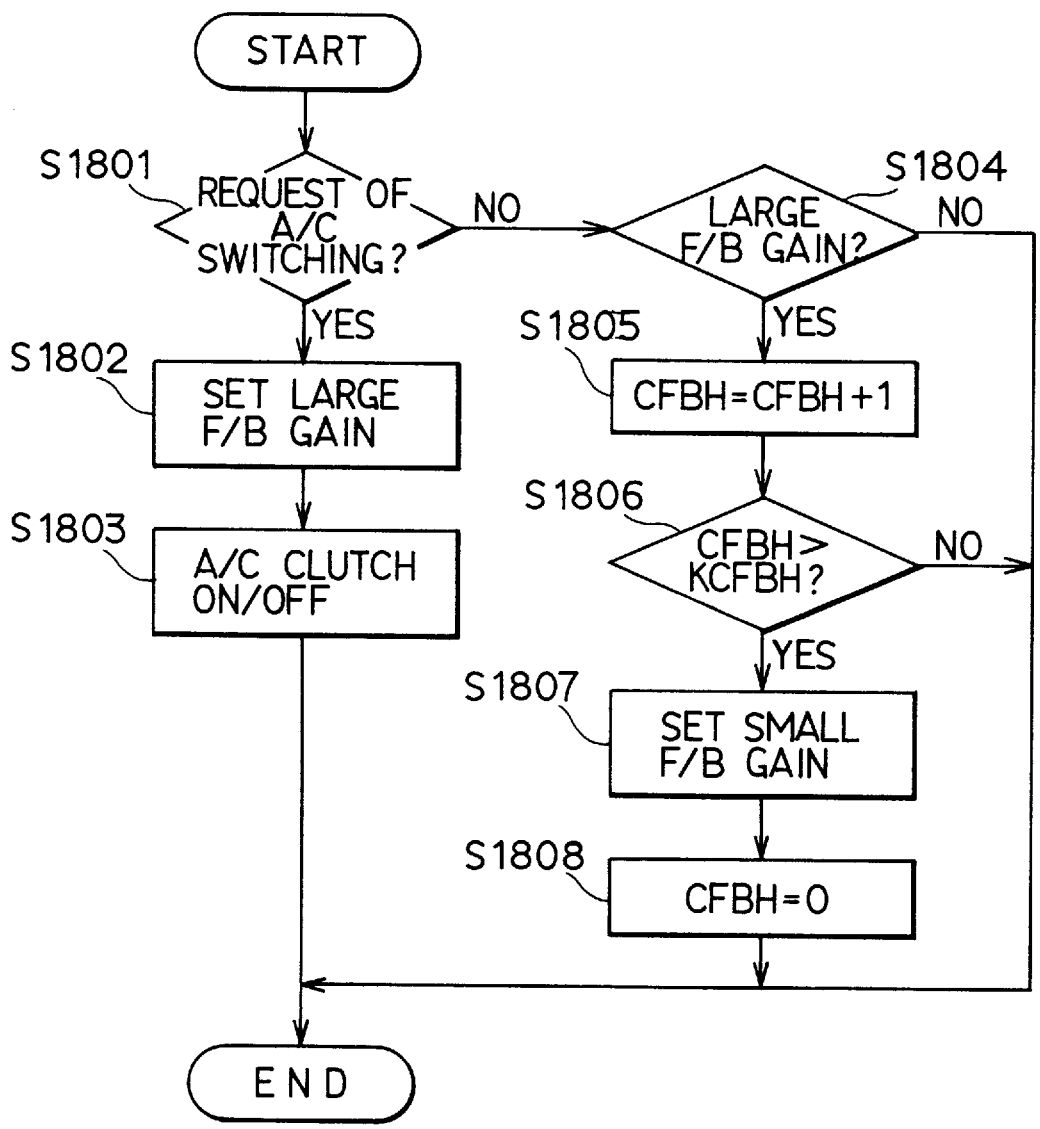
FIG. 18 is a flowchart of the engine control operation based on a seventh embodiment of this invention.

FIG. 18 shows by flowchart exhaust gas detoxifying system based on the seventh embodiment of this invention, which operates to alleviate fluctuation of air-fuel ratio caused by switching the feedback gain of the control system.

The basic arrangement of the system is identical to that shown in FIG. 1. The engine controller 70 implements air-fuel ratio feedback control for engine 10 in accordance with the control routine shown in FIG. 2. The control routine shown in FIG. 18 is a variant version of the air conditioner control of step S100 in FIG. 2, which is carried out periodically by engine controller 70.

The first step S1801 checks as to whether there is a request of turn-on or turn-off switching of air conditioner 50 from air conditioner controller 80. If there is any air conditioner switching request, the next step S1802 selects the larger feedback gain of the air-fuel ratio feedback control and subsequent step S1803 grants the switching of the air conditioner as requested. Based on an enhanced control response accomplished by the larger feedback gain of the control system, the disturbance of air-fuel ratio, if it has been triggered by switching of the air conditioner, diminishes swiftly.

If there is no air conditioner switching request in step S1801, the next step S1804 verifies the feedback gain. If feedback gain is larger, the subsequent step S1805 increments a counter CFBH which counts the expected time length of the cessation of the disturbance of air-fuel ratio. The next step S1806 compares the count value of CFBH counter with the prescribed threshold value KCFBH. When it exceeds KCFBH, the next step S1807 restores the smaller feedback gain, and the subsequent step S1808 clears the CFBH counter. Accordingly, after the disturbance of the air-fuel ratio caused by air conditioner switching operation has ceased through the operation of steps S1804–S1806, air-fuel feedback control with the enhanced stability resumes.

As a consequence of the correction of a disturbed air-fuel ratio caused by air conditioner switching, the degraded detoxifying performance of catalytic converter 31 caused by disturbed air-fuel ratio can also be improved, and consequently aggravation of toxic exhaust gas emission due to operation of the air conditioner can be prevented properly.

The air-fuel ratio A/F also varies in response to switching of the compressor capacity, and accordingly it is possible to design a system with a variable-capacity air conditioner compressor to damp fluctuation of the air-fuel ratio by manipulating the control feedback gain immediately before switching compressor capacity.

The system of this embodiment can be combined with the preceding first through fourth embodiments.

Although specific embodiments of the present invention have been explained, various changes can be made by those skilled in the art without departing from the spirit and scope of the invention.

What is claimed is:

1. An air conditioner control system for an air conditioner and catalytic converter coupled to an internal combustion engine of a vehicle, said system comprising:

means of calculating a degree of air conditioning necessity by the air conditioner which is driven by the internal combustion engine and used for air conditioning a vehicle interior; and means for restricting operation of the air conditioner in response to the calculated degree of air conditioning necessity and to a determination of whether exhaust gas detoxification performance of the catalytic converter in an exhaust system of the engine is expected to deteriorate.

2. An air conditioner control system as in claim 1 wherein:

the means for restricting operation of the air conditioner delays activation timing of the air conditioner depending on the calculated degree of air conditioning necessity.

3. An air conditioner control system as in claim 1 wherein:

the means for restricting halts operation of the air conditioner, at prescribed time intervals, by a time period that depends on the calculated degree of air conditioning necessity.

4. An air conditioner control system as in claim 1 wherein:

the means for restricting comprises means delays timing of an increase in capacity of a variable-capacity compressor, which is driven by the engine, of the air conditioner depending on the calculated degree of air conditioning necessity.

5. An air conditioner control system as in claim 1 wherein:

the means for restricting limits an increase of capacity for a variable-capacity compressor, which is driven by the engine, of the air conditioner depending on the calculated degree of air conditioning necessity.

6. An air conditioner control system as in claim 1 wherein:
the means for calculating sets the degree of air conditioning necessity in proportion to a difference between vehicle interior temperature and a target temperature.

7. An air conditioner control system as in claim 1 wherein:
the means for calculating sets a degree of air conditioning necessity in proportion to at least one of: vehicle exterior temperature, vehicle interior temperature, sun light strength, evaporator output air temperature, ventilator output air temperature, evaporator air flow rate, compressor output pressure, compressor input pressure, evaporator output super-heating, and compressor duty cycle.

8. An air conditioner control system as in claim 1 wherein:
the means for calculating sets a degree of air conditioning necessity in inverse proportion to at least one of: engine rotational speed, condenser air flow rate, vehicle speed, and quantity of evaporator frost.

9. A method for controlling an air conditioner for an internal combustion engine of a vehicle equipped with a catalytic converter, the method comprising the steps of:
feedback controlling an air-fuel ratio of air-fuel mixture to be fed to the engine in response to a detected air-fuel ratio of the mixture;
stopping the feedback control during acceleration and heavy load conditions of the engine;
calculating a degree of air conditioning necessity by the air conditioner which is driven by the engine and used for the air conditioning of a vehicle interior; and
restricting operation of the air conditioner depending on the calculated degree of air conditioning necessity if the feedback control is stopped.

10. A method according to claim 9, wherein:
the restricting step delays timing of activation of the air conditioner depending on the calculated degree of air conditioning necessity.

11. A method according to claim 9, wherein:
the restricting step halts operation of the air conditioner at each of prescribed time intervals, by a time period that depends on the calculated degree of air conditioning necessity.

12. An air conditioner control system for a catalytic converter equipped vehicle, said system comprising:
means for determining a variable degree of air conditioning necessity;
means for determining if catalytic converter performance is expected to deteriorate under a current vehicle operational state due to air conditioner operation; and
means for variably restricting air conditioner operation by a variable degree if catalytic converter performance is expected to deteriorate in response to said variable degree of air conditioning necessity.

13. An air conditioner control system as in claim 12 wherein said variable degree of air conditioning necessity includes a signal varying from zero to a pre-determined maximum.

14. An air conditioning control system as in claim 12 wherein said air conditioner operation is restricted by reducing the duty cycle of a cyclic turned-on state.

15. A method of controlling an air conditioner in a catalytic-converter equipped vehicle, said method comprising:
determining a variable degree of air conditioning necessity;
determining if catalytic-converter performance is expected to deteriorate under a current vehicle operational state due to air conditioner operation; and
if catalytic converter performance is expected to deteriorate, variably restricting air conditioner operation in response to said variable degree of air conditioning necessity.

16. A method as in claim 15 wherein said variable degree of air conditioning necessity includes a signal varying from zero to a pre-determined maximum.

17. A method as in claim 15 wherein said air conditioner operation is restricted by reducing the duty cycle of a cyclic turned-on state.

* * * * *